(No Model.) 2 Sheets—Sheet 1.
R. W. McCLELLAND.
RUNNING GEAR FOR VEHICLES.
No. 366,969. Patented July 19, 1887.
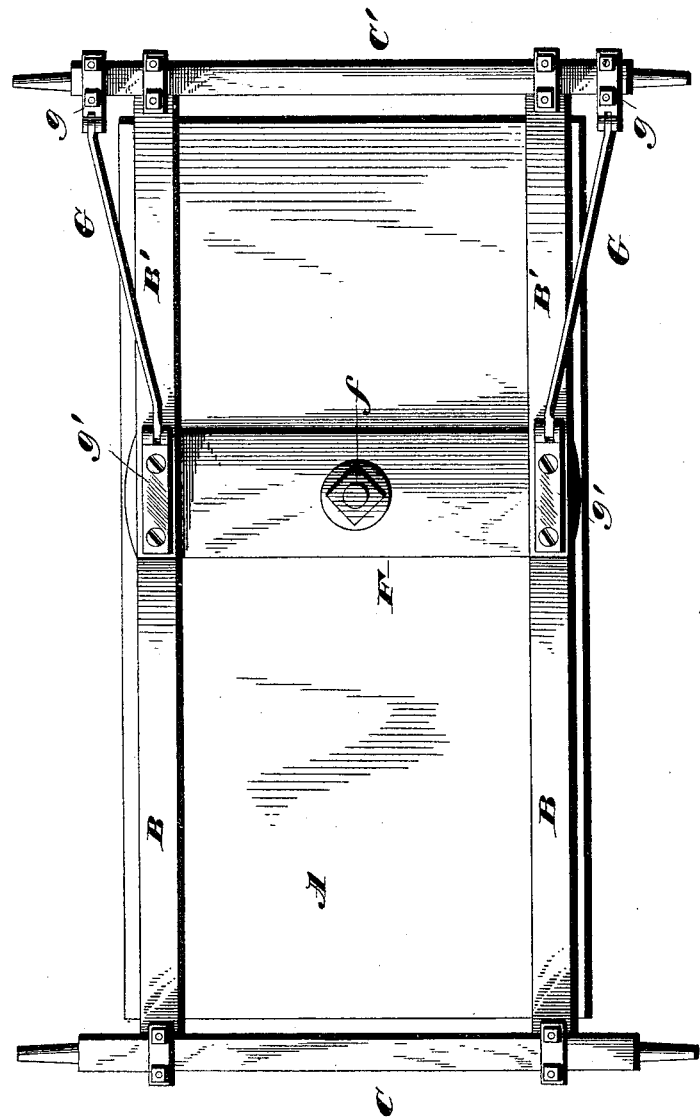
WITNESSES
RobertW McClelland
INVENTOR
Attorney (No Model.) 2 Sheets—Sheet 2.
R. W. McCLELLAND.
RUNNING GEAR FOR VEHICLES.
No. 366,969. Patented July 19, 1887.
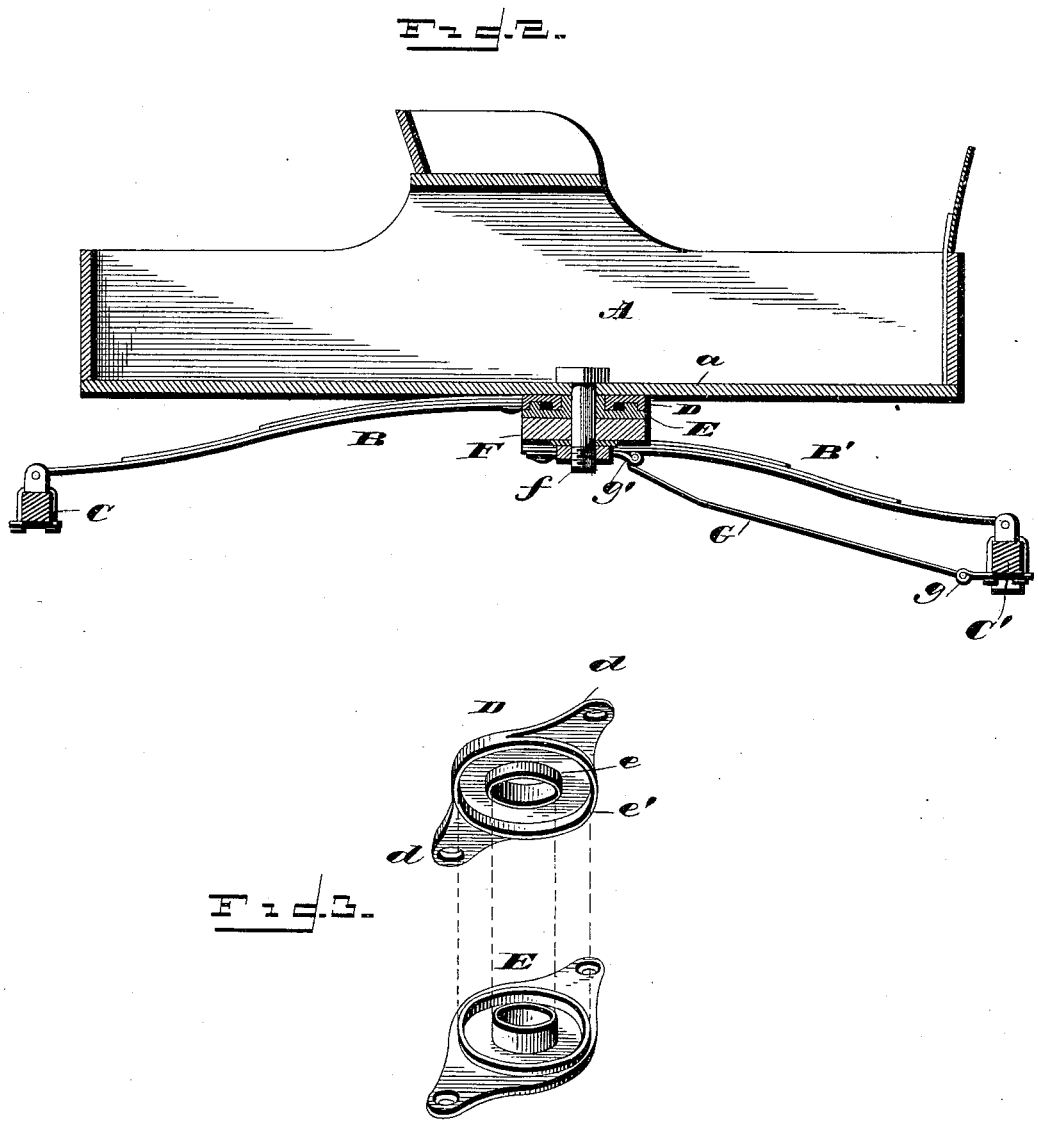

UNITED STATES PATENT OFFICE.

ROBERT W. McCLELLAND, OF CLINTON, ILLINOIS.

RUNNING-GEAR FOR VEHICLES.

SPECIFICATION forming part of Letters Patent No. 366,969, dated July 19, 1887.

Application filed March 10, 1887. Serial No. 230,403. (No model.)

*To all whom it may concern:*

Be it known that I, ROBERT W. MCCLELLAND, a citizen of the United States of America, residing at Clinton, in the county of De Witt and State of Illinois, have invented certain new and useful Improvements in Running-Gear for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in springs and running-gear for vehicles; and it consists more particularly in the construction and combination of the parts, whereby I produce a running-gear which is so constructed that the vehicle to which it is applied may make a very short turn.

My invention also relates to the construction and arrangement of the fifth-wheel and the attachment of springs thereto, said springs being also connected and braced to the front axle.

In the accompanying drawings, which illustrate my invention, Figure 1 is a plan or bottom view of a vehicle, showing my improvement attached thereto. Fig. 2 is a longitudinal sectional view, and Fig. 3 is a detail perspective view of the fifth-wheel detached.

A refers to the body of the vehicle, which by preference has a rigid bottom board, $a$, to which bottom board the sides are attached. At near the central portion of the body, adjacent to the sides thereof, are attached springs B, which may consist of two or more leaves, the bottom leaf extending under the end of the vehicle, where it is turned into an eye for attachment to a clip, which forms a means for connecting said spring to the hind axle, C. The end of the spring opposite the hind axle, C, is securely bolted to the bottom board A of the vehicle.

D refers to the upper plate of the fifth-wheel, which is provided with side-extending portions $d\ d$, which have perforations through which securing-bolts pass for attaching this upper plate to the bottom of the vehicle, and this upper portion of the fifth-wheel is provided with a central opening and downwardly-extending circular flanges $e$ and $e'$. The bottom portion, E, of the fifth-wheel is of similar construction, though the circular flanges thereof are of preferably less diameter than the circular flanges of the upper portion of the fifth-wheel, so that these flanges on the lower portion will fit into the upper flanges. The laterally-projecting wings or side pieces of the lower portion of the fifth-wheel are bolted to a cross-bar, F, which is of sufficient length to extend across the entire bottom of the vehicle, and the bottom board of the vehicle is connected to the transverse board by a bolt and nut, $f$, which serve to hold the parts securely upon each other, so that they may have a horizontal pivotal movement.

To the ends of the transverse board F are attached springs B', these springs extending to a point over the front axle, C', to which they are clipped in any suitable manner. These springs B' are re-enforced by a brace-rod, G, the front end of which is pivotally attached to a clip, $g$, which is secured to the front axle, while the rear portion is attached pivotally to a clip, $g'$, which is secured to the transverse board F by the same bolts which hold the spring B' thereon.

A vehicle constructed as hereinbefore described is simple, and the parts are not liable to get out of order, and the same may be cheaply manufactured, and as the draft movement is communicated from the front axle to the central portion of the vehicle, said movement is so slight that it will not be obvious to the occupant of the vehicle. Besides the aforesaid advantages, a vehicle constructed as shown in the accompanying drawings can be turned in a very short space.

I claim—

1. In a vehicle, the combination of the body having a rigid bottom board, springs secured at front to said body near the center and at rear to the rear axle, a fifth-wheel, one member of which is secured to the vehicle-body near the center and the other member to a transverse bar, and independent side springs secured at their rear ends to the outer ends of the transverse bar and at their forward ends to the front axle, substantially as described.

2. The combination of a vehicle-body provided centrally with a fifth-wheel plate and independent side springs connected at their rear ends to the rear axle, a transverse bar provided on its upper side with a fifth-wheel plate and at its ends with independent side springs and brace-rods connected at their forward ends to the front axle, and the king-bolt passing centrally through said plates and bar to connect the front axles to the body, substantially as described.

In testimony whereof I affix my signature in presence of two witnesses.

ROBERT W. McCLELLAND.

Witnesses:
JOHN F. MARTIN,
STEPHEN K. CARTER.